(12) United States Patent
Sims et al.

(10) Patent No.: US 6,709,287 B2
(45) Date of Patent: Mar. 23, 2004

(54) ELECTRICAL CONNECTION MODULE FOR USE ON A VEHICLE

(75) Inventors: Charles D. Sims, Springfield, OH (US); Brian G. Smith, Urbana, OH (US); Stanley W. Larison, Urbana, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 505 days.

(21) Appl. No.: 09/755,845

(22) Filed: Jan. 5, 2001

(65) Prior Publication Data

US 2002/0096379 A1 Jul. 25, 2002

(51) Int. Cl.[7] .................................................. H01R 9/22
(52) U.S. Cl. ........................ 439/559; 439/908; 200/296
(58) Field of Search ........................ 439/34, 559, 908, 439/801, 797; 200/296; 174/151, 152, 153 R; 429/100, 150

(56) References Cited

U.S. PATENT DOCUMENTS

| | | | |
|---|---|---|---|
| 497,732 A | * | 5/1893 | Stupakoff .................... 439/814 |
| 1,501,832 A | * | 7/1924 | Amend ......................... 429/96 |
| 2,008,275 A | * | 9/1935 | Dyer ........................... 200/296 |
| 2,948,773 A | * | 8/1960 | Hawes |
| 3,850,501 A | * | 11/1974 | Butterfield et al. |
| 4,023,042 A | * | 5/1977 | Archer, Jr. et al. |
| 4,092,506 A | * | 5/1978 | Saulters |
| 5,006,078 A | * | 4/1991 | Crandall ..................... 439/521 |
| 5,522,734 A | * | 6/1996 | Goertzen .................... 439/500 |
| 5,639,268 A | * | 6/1997 | Julian et al. ................. 439/908 |
| 5,649,841 A | * | 7/1997 | Martinez ..................... 439/712 |

* cited by examiner

Primary Examiner—Neil Abrams
(74) Attorney, Agent, or Firm—Jeffrey P. Calfa; Dennis Kelly Sullivan; Susan L. Lukasik

(57) ABSTRACT

An electrical connection module is disclosed for electrically connecting electrical components disposed upon opposite sides of a module mounting component to one another. The electrical connection module comprises a rigid body with a first electrical terminal and a second electrical terminal engaged to the rigid body of the electrical connection module. The electrical connection module is to be fixedly mounted to the module mounting component (cable) with the first electrical terminal protruding from a second side of the module mounting component, through a passageway defined in the module mounting component, to a first side of the module mounting component. The second electrical terminal of the electrical connection module is disposed upon the second side of the module mounting component (cable). An electrical component is electrically connected to an electrical terminal of the electrical connection module at a point disposed upon one side of the module mounting component (cable). Another electrical component is electrically connected to an other electrical terminal at a point disposed upon a second side of the module mounting component (cable). The electrical connection module is constructed such that the first electrical terminal and the second electrical terminal are or may be electrically connected to one another. The connection module is applicable to connecting switches and relays through and upon opposite sides of vehicle module mounting components as well as to connecting relays to batteries through and to vehicle mounting components.

6 Claims, 11 Drawing Sheets

ELECTRICAL CONNECTION MODULE FOR USE ON A VEHICLE

BACKGROUND OF THE INVENTION

The present invention relates to electrical connection assemblies for electrically connecting electrical components of electrical systems so that electricity may flow between the electrical components through the electrical connection assemblies. More specifically, the present invention relates to electrical connection assemblies for electrically connecting one or more electrical components that are disposed generally upon one side of one or more structural components to one or more electrical components that are disposed generally upon an opposite side of the structural component (s). For example, many vehicles have electrical batteries that are electrically connected to other components of an electrical system of the vehicle. In many cases, structural components of the vehicle are disposed generally between the electrical batteries of the vehicle and the electrical components of the electrical system of the vehicle to which the electrical batteries are electrically connected. In such cases, the electrical connection assemblies that electrically connect the electrical batteries to the electrical components of the electrical system must extend around or through the structural components that are disposed generally between the electrical batteries and the electrical components they are electrically connected to. Often, the electrical connection assemblies that electrically connect the electrical batteries to other electrical components of the vehicle comprise battery cables. The battery cables of such electrical systems are often routed around structural components of the vehicle that are disposed generally between the electrical batteries and the electrical components of the vehicle that the electrical batteries are electrically connected to by the battery cables. Battery cables that are routed around structural components of the vehicle must be relatively long. Battery cables that are of a relatively long construction, in order to accommodate routing of them around structural components of the vehicle are relatively expensive because of their relatively long construction. Special precautions are often taken to reduce the potential that battery cables that are routed around structural components of the vehicle will be damaged by abrasion between the battery cables and the structural components of the vehicle around which the battery cables are routed. Examples of such special precautions include providing abrasion resistant insulation for the battery cables, installing abrasion resistant sleeves around battery cables at points of potential abrasion between battery cables and structural components, and clipping battery cables at certain points to reduce their movement. All of these precautionary measures increase the cost to construct and assemble the electrical system of the vehicle. Alternatively, the battery cables may be routed through passageways defined through structural components of the vehicle that are disposed generally between the electrical batteries and the electrical components of the vehicle that the electrical batteries are connected to. In general, routing battery cables through such passageways defined through structural components of the vehicle allows for the use of shorter battery cables than would be necessary in order to accommodate routing of battery cables around structural components of the vehicle. Unfortunately, the process of assembling a vehicle with battery cables routed through such passageways defined through the structural components of the vehicle can be somewhat of a challenging task. This is often true because battery cables are generally very stiff, and depending upon the relative position of the components of the electrical system and the passageways defined through the structural components of the vehicle, it can be challenging to manipulate the battery cables to route them through these passageways. It is also often necessary to take special precautions to reduce the potential that the battery cables will be damaged by abrasion between the battery cables and the portions of the structural components that define the passageways through which the battery cables are to be routed.

SUMMARY OF INVENTION

It is thus,—an object of the present invention to provide an electrical connection assembly for connecting one or more electrical components disposed generally upon one side of a component to one or more electrical components disposed generally upon an opposite side of the component without routing electrical wiring around or through the component. The present invention includes an electrical connection module for inclusion in an electrical connection assembly that electrically connects two or more electrical components of an electrical system to one another. The present invention also includes a vehicle that comprises one or more such electrical connection modules. The electrical connection module is constructed to be rigidly mounted to a module mounting component. The electrical connection module includes a body portion, which is rigid, and to which a first electrical terminal, which is also rigid, is fixedly engaged. The electrical connection module is constructed to be fixedly mounted to a module mounting component. More specifically, the electrical connection module is constructed to be mounted to the module mounting component with the first electrical terminal extending from one side of the module mounting component, through a passageway defined through the module mounting component, to an opposite side of the module mounting component. The electrical connection module is constructed such that, when it is mounted to the module mounting component in such a manner, the first electrical terminal protrudes to a side of the module mounting component opposite a side upon which the body of the electrical connection module is disposed. The electrical connection module also comprises a second electrical terminal that is engaged to the body of the electrical connection module. The electrical connection module is constructed such that, when the electrical connection module is properly mounted to the module mounting component, the second electrical terminal is disposed upon a same side of the module mounting component as the body of the electrical connection module. The electrical connection module is constructed in a manner such that the first electrical terminal and the second electrical terminal are or may be electrically connected to one another so that electricity may flow from the first electrical terminal to the second electrical terminal. The electrical connection module may be constructed in a manner such that the first electrical terminal and the second electrical terminal are always electrically connected to one another. Alternatively, the electrical connection module may be constructed in a manner such that the first electrical terminal and the second electrical terminal may be selectively electrically connected to or disconnected from one another. The first electrical terminal and the second electrical terminal of the electrical connection module are constructed in a manner allowing electrical connection of other electrical components to them. Such an electrical connection module may be used to electrically connect an electrical component disposed generally upon one side of the module mounting component to an electrical component disposed generally upon an opposite side of the module mounting component, without routing electrical wiring around or through the module mounting component.

Thus, it can be seen that all of the above-mentioned objects of the invention, as well as other objects not mentioned, have been met.

DRAWINGS

Other objects and advantages of the invention will become more apparent upon perusal of the detailed description thereof and upon inspection of the drawings in which.

DETAILS OF INVENTION

Figure 1:
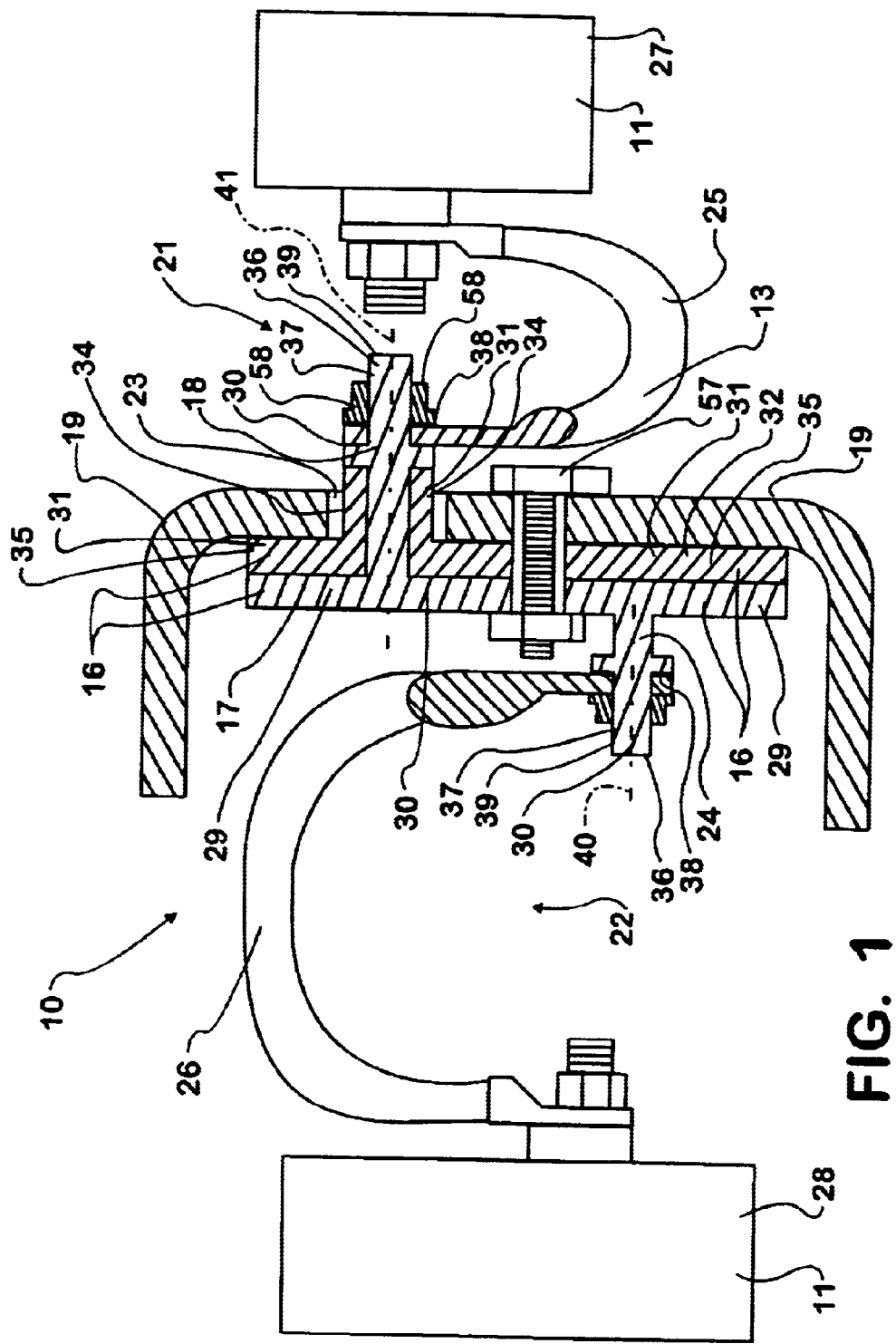
FIG. 1 shows, partially in section, a first embodiment of the electrical connection assembly of the present invention mounted to the module mounting component of the present invention and electrically connected to the first electrical component and the second electrical component of the invention.

The present invention includes an electrical connection module 17 for inclusion in an electrical connection assembly 13. The present invention also includes a vehicle 20 that includes the electrical connection module 17 of the present invention. The electrical connection assembly 13 is electrically connected to a plurality of electrical components 11. The construction of the electrical connection assembly 13 is such that electricity may flow through the electrical connection assembly 13, between electrical components 11 that are electrically connected to the electrical connection assembly 13. Such electrical connection assemblies 13 are well known. These electrical connection assemblies 13 are constructed of any of a number of different types of electricity conducting components including but not limited to electrical wiring, electric cables, switches, and wiring harnesses. In many cases, other components are disposed generally between the electrical components 11 that are electrically connected to one another by the electrical connection assembly 13. In such cases, it is necessary that certain portions of the electrical connection assembly 13 extend around or through these components that are disposed generally between the electrical components 11 that the electrical connection assembly 13 electrically connects. According to the present invention, the electrical connection module 17 is electrically connected to a first electrical component 27 and a second electrical component 28. The electrical connection module 17 is fixedly mounted to a module mounting component 19 that is disposed generally between the first electrical component 27 and the second electrical component 28. The electrical connection module 17 may be fixedly mounted to the module mounting component 19 using any number of means easily imagined by on of ordinary skill in the art. The electrical connection module 17 may be fixedly mounted to the module mounting component 19 with fasteners or adhesives. The two components may, alternatively, be engaged to one another by engagement of portions of the electrical connection module 17 that are constructed to be engaged to portions of the module mounting component 19 in a manner fixedly engaging the components to one another. In the preferred embodiment, the electrical connection module 17 is fixedly engaged to the module mounting component 19 with threaded fasteners. The first electrical component 27 that the electrical connection module 17 is electrically connected to is disposed upon a first side 21 of the module mounting component 19. The second electrical component 28 that the electrical connection module 28 is electrically connected to is disposed upon a second side 22 of the module mounting component 19. The electrical connection module 19 is constructed such that it may electrically connect to one another the first electrical component 27 and the second electrical component 28. The electrical connection module 17 may be constructed such that the first electrical component 27 and the second electrical component 28 are always electrically connected to one another by the electrical connection module 17. Alternatively, the electrical connection module 17 may be constructed such that the first electrical component 27 and the second electrical component 28 may be selectively electrically connected to or disconnected from one another by the electrical connection module 17.

The electrical connection module 17 includes a rigid body 16 that is constructed to be fixedly mounted to the module mounting component 19. The rigid body 16 of the electrical connection module may be fixedly mounted to the module mounting component 19 by any of a number of means. In the preferred embodiment the rigid body 16 of the electrical connection module 17 is releaseably fixedly mounted to the module mounting component 19 with threaded fasteners 57. The rigid body 16 of the electrical connection module 17 is to be disposed generally upon the second side 22 of the module mounting component 19. In fact, the second side 22 of the module mounting component 19 is defined to be the side of the module mounting component 19 upon which the rigid body 16 of the electrical connection module 17 is generally disposed. The first side 21 of the module mounting component 19 is defined to be the side of the module mounting component 19 opposite a side upon which the rigid body 16 of the electrical connection module 17 is disposed. The electrical connection module 17 also includes a first electrical terminal 18 that is of a rigid construction and is rigidly engaged to the rigid body 16 of the electrical connection module 17. The first electrical terminal 18 is constructed of a material that has a relatively low electrical resistance such as a metallic material. The first electrical terminal 18 protrudes from a portion of the rigid body 16 of the electrical connection module 17 that is disposed upon a second side 22 of the module mounting component 17. The first electrical terminal 18 is engaged to the rigid body 16 of the module mounting component 19 at a point disposed upon the second side 22 of the module mounting component 19. From its point of engagement to the rigid body 16 of the electrical connection module 17 the first electrical terminal extends toward its free end 36 and through a passageway 23 defined through the module mounting component 19. The free end 36 of the first electrical terminal 18 is disposed upon the first side 21 of the module mounting component 19. The electrical connection module 17 comprises a second electrical terminal 24 that is of a rigid construction and that is fixedly engaged to a portion of the rigid body 16 that is disposed upon the second side 22 of the module mounting component 19. The second electrical terminal 24 is constructed of a material that has a relatively low electrical resistance such as a metallic material. The second electrical terminal 24 is disposed substantially entirely upon the second side 22 of the module mounting component 19. The first electrical component 27, that is disposed generally upon the first side 21 of the module mounting component 19 is electrically connected to the first electrical terminal 18 of the electrical connection module 17. The point of electrical connection of the first electrical component 27 to the first electrical terminal 18 is disposed upon the first side 21 of the module mounting component 19. The first electrical component 27 may be directly electrically connected to the first electrical terminal 18. Alternatively, the first electrical component 27 may be directly electrically connected to first side electricity conducting components 25 that are, in turn, electrically connected to the first electrical terminal 18. The second electrical component 28, that is disposed generally upon the second side 22 of the module mounting component 19 is electrically connected to the second electrical terminal 24 of the electrical connection module 17. The point of electrical connection of the second electrical component 28 to the second electrical terminal 24 is disposed upon the second side 22 of the module mounting component 19. The second electrical component 28 may be directly electrically connected to the second electrical terminal 24. Alternatively, the second electrical component 28 may be directly electrically connected to second side electricity conducting components 26 that are, in turn, electrically connected to the second electrical terminal 24. As was mentioned above, the electrical connection module 17 is constructed such that the first electrical terminal 18 and the second electrical terminal 24 are or may be electrically connected to one another so that electricity may flow between the first electrical terminal 18 and the second electrical terminal 24. Thus when the first electrical terminal 18 and the second electrical terminal 24 are electrically connected to one another, the first electrical component 27 and the second electrical component 28 are electrically connected to one another through the electrical connection module 17.

Figure 2:
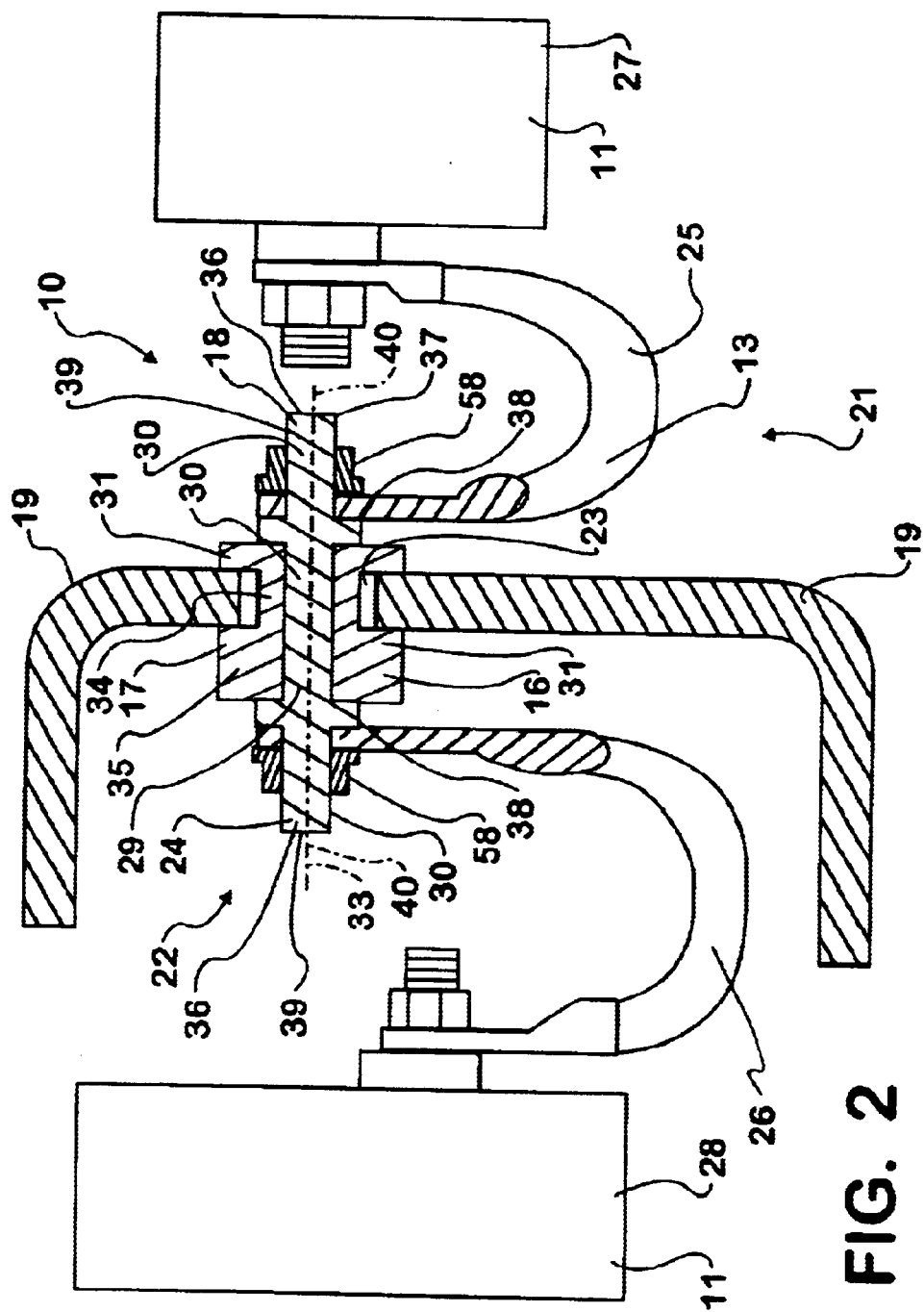
FIG. 2 shows, partially in section, a second embodiment of the electrical connection assembly of the present invention mounted to the module mounting component of the present invention and electrically connected to the first electrical component and the second electrical component of the invention.
Figure 3:
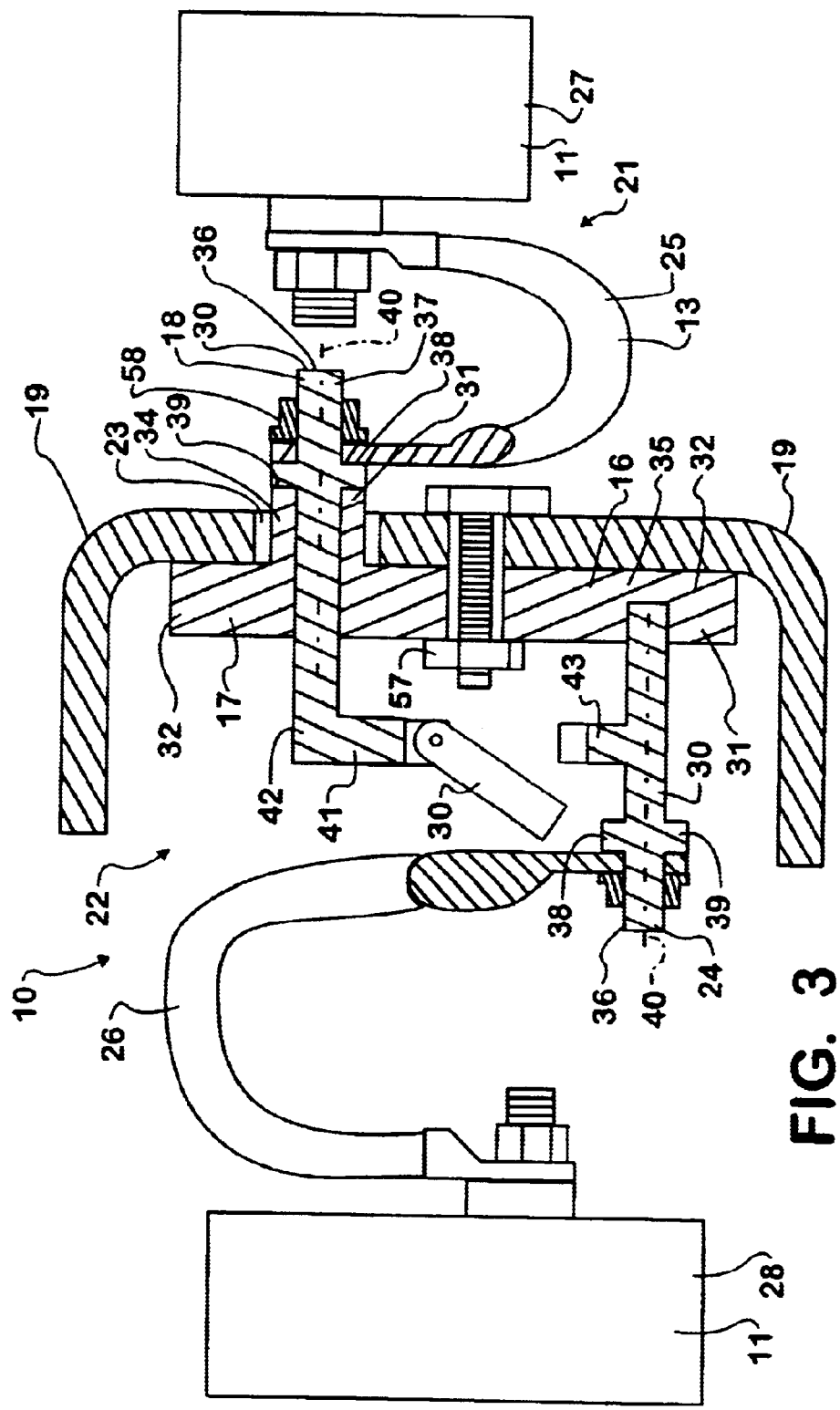
FIG. 3 shows, partially in section, a third embodiment of the electrical connection assembly of the present invention mounted to the module mounting component of the present invention and electrically connected to the first electrical component and the second electrical component of the invention.
Figure 8:
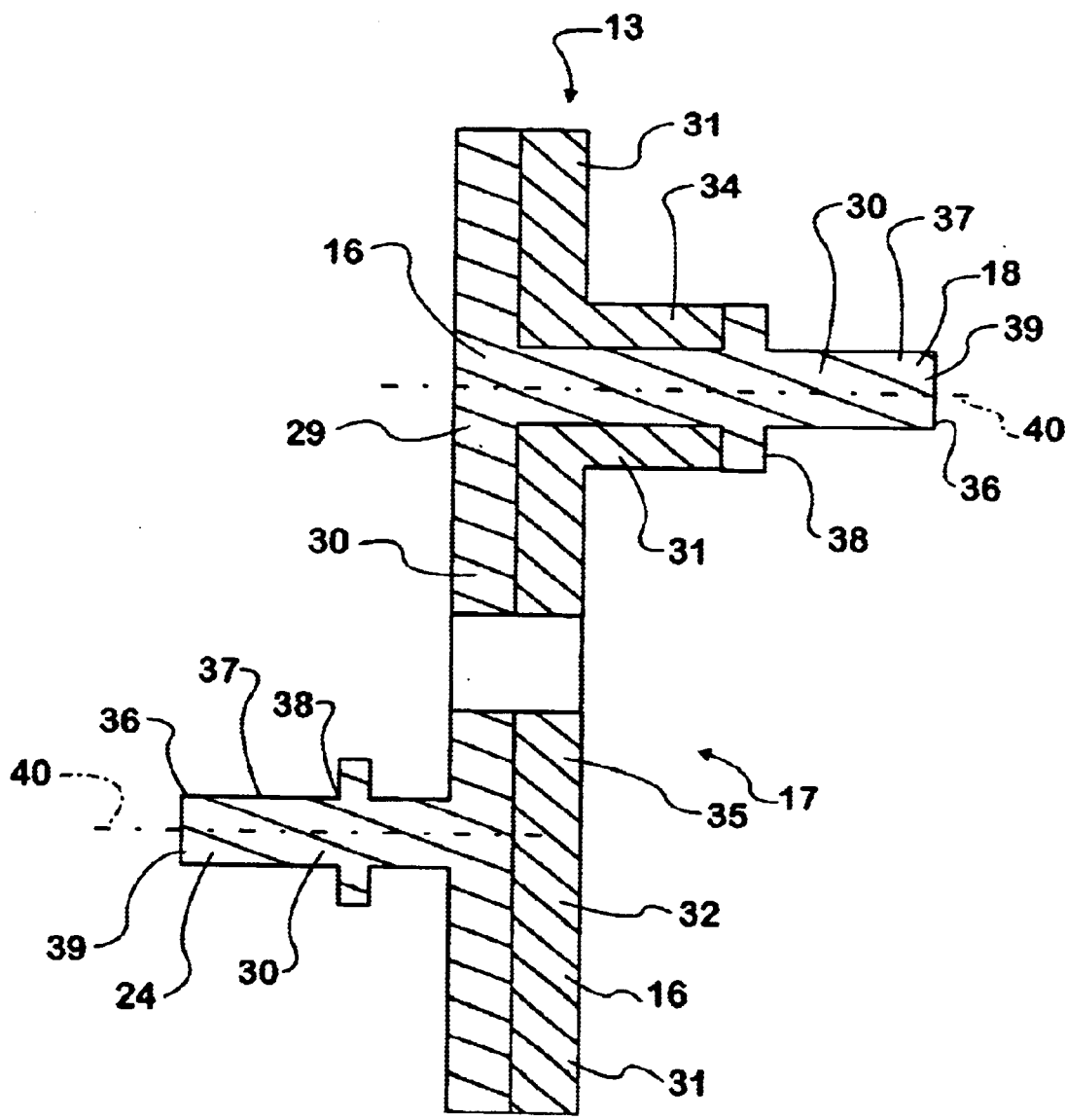
FIG. 8 shows, partially in section, a first embodiment of the electrical connection module of the present.
Figure 9:
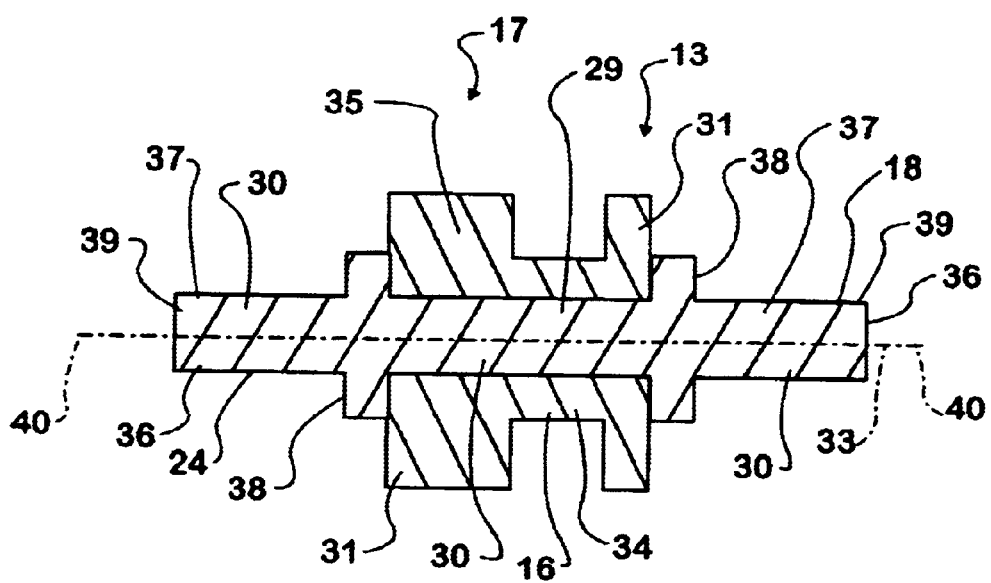
FIG. 9 shows, partially in section, a second embodiment of the electrical connection module of the present.
Figure 10:
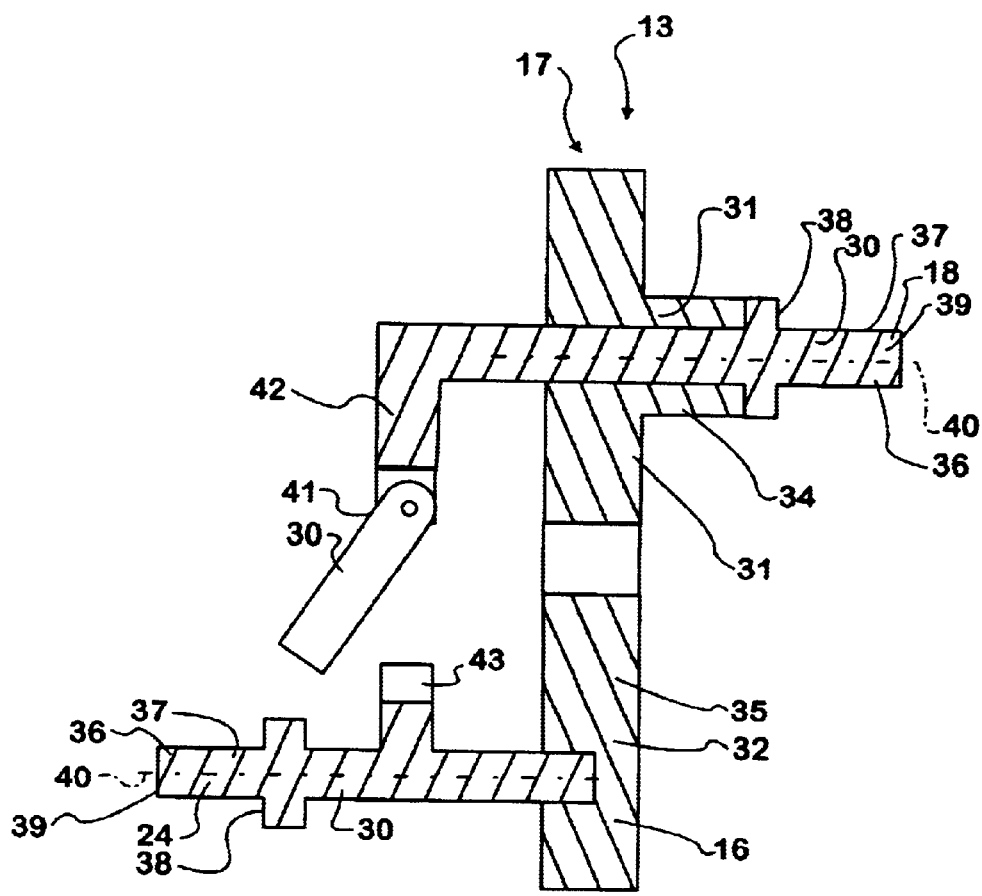
FIG. 10 shows, partially in section, a third embodiment of the electrical connection module of the present.

As mentioned above, the electrical connection module 17 may be constructed such that the first electrical terminal 18 and the second electrical terminal 24 are always electrically connected to one another. Any of a number of constructions of the electrical connection module 17 could be employed that would effect this result. The first electrical terminal 18 may be electrically connected to the second electrical terminal 24 by electrical wires, cables, or other electricity conducting components. In one embodiment, the rigid body 16 of the electrical connection module 17 comprises a rigid metallic member 29 that electrically connects the first electrical terminal 18 to the second electrical terminal 24. In this embodiment the first electrical terminal 18 is fixedly engaged to the rigid metallic member 29 in such a manner that the two components are electrically connected and electricity can, therefore, flow between them. Also in this embodiment, the second electrical terminal 24 is fixedly engaged to the rigid metallic member 29 in such a manner that they are electrically connected and electricity can, therefore, flow between them. The engagement of the first electrical terminal 18 and the second electrical terminal 24 to the rigid metallic member 29 may be any of a number of different designs that would effect the functionality described above and that could be easily imagined by one of ordinary skill in the art. Thus, the first electrical terminal 18 and the second electrical terminal 24 are electrically connected to one another so that electricity can flow between them through the rigid metallic member 29 that they are both electrically connected to. In order that it is possible for electricity to flow through the rigid metallic member 29 between the first electrical terminal 18 and the second electrical terminal 24, the rigid metallic member 29 must be constructed of a metal that has a relatively low electrical resistance as most metals do. The shape and size of the rigid metallic member 29 may be any of a number of different designs that would effect the functionality described above, that would interact appropriately with all other components, and that could be easily imagined by one of ordinary skill in the art. The rigid metallic member 29 may be constructed with a strength and may be engaged to the other portions of the rigid body 16 of the electrical connection module 17 in such a manner that it provides substantial reinforcement for the rigid body 16. The electrical connection module 17 may, in fact, be constructed such that the rigid metallic member 29 is the rigid body 16 of the electrical connection module 17. Two different embodiments of electrical connection modules 17 that include such a rigid metallic member 29 are illustrated in FIGS. 1, 2, 8 and 9. The rigid metallic member 29 may extend a relatively large distance, in directions perpendicular to the direction that the first electrical terminal 18 protrudes from the rigid body 16, between the first electrical terminal 18 and the second electrical terminal 24. An example of an electrical connection module 17 constructed in such a manner is shown in FIGS. 1 and 8. Alternatively, the first electrical terminal 18, the rigid metallic member 29, and the second electrical terminal 24 may be constructed of a unitary elongated member extending along a common longitudinal axis 33. An example of such a construction of the electrical connection module 17 is shown in FIGS. 2 and 9.

The electrical connection module 17 may, alternatively, be constructed such that the first electrical terminal 18 and the second electrical terminal 24 may be selectively electrically connected to or disconnected from one another. In this embodiment, the electrical connection module 17 further comprises an electrical switching device 41 mounted to the rigid body 16 of the electrical connection module 17. The electrical switching device 41 comprises a first switch terminal 42 that is electrically connected to the first electrical terminal 18 of the electrical connection module 17. The electrical switching device 41 also comprises a second switch terminal 43 that is electrically connected to the second electrical terminal 24 of the electrical connection module 17. The electrical switching device 41 comprises electricity conducting elements that are electrically connected to the first switch terminal 42 and electricity conducting elements that are electrically connected to the second switch terminal 43. The construction of the electrical switching device 41 is such that the electricity conducting elements that are electrically connected to the first switch terminal 42 and the second switch terminal 43 may selectively be electrically connected to one another or disconnected from one another. When the electricity conducting elements connected to the first switch terminal 42 and the second switch terminal 43 are electrically connected to one another, the electrical switching device 41 is considered to be in a closed operational state. When the electricity conducting elements connected to the first switch terminal 42 and the second switch terminal 43 are electrically disconnected from one another, the electrical switching device 41 is considered to be in an open operational state. When the electrical switching device 41 is in its closed operational state, the first electrical terminal 18 and the second electrical terminal 24 are electrically connected to one another. When the electrical switching device 41 is in its open operational state, the first electrical terminal 18 and the second electrical terminal 24 are electrically disconnected from one another. It should be noted that, for the purposes of this disclosure, reference to the operational state of the electrical switching device 41 of the electrical connection module 17 is descriptive only of its operational state relative to connection of the first electrical terminal 18 to the second electrical terminal 24. For example, the electrical switching device 41 may be in its open operational state relative to its connection of the first electrical terminal 18 to the second electrical terminal 24, while simultaneously being in a closed operational state relative to other components it is electrically connected to. In such a situation, the electrical switching device 41 would be considered to be in its closed operational state according to the meaning of that terminology within this disclosure. Construction of the electrical connection module in such a manner allows for the selective electrical connection to or disconnection from one another of the first electrical terminal 18 and the second electrical terminal 24 of the electrical connection module 17. FIGS. 3, 4, 10, and 11 illustrate electrical connection modules 17 that include electrical switching devices 41 electrically connected between the first electrical terminal 18 and the second electrical terminal 24 of the electrical connection module 17 in a manner in accordance with the present invention. The electrical switching device 41 is illustrated in a relatively simplified manner without inclusion of many of the details of construction of the electrical switching device 41 in the figures. There are many different types of electrical switching devices 41, the details of the construction of which are well known, that could be utilized in the electrical connection module 17 of the present invention.

Figure 4:
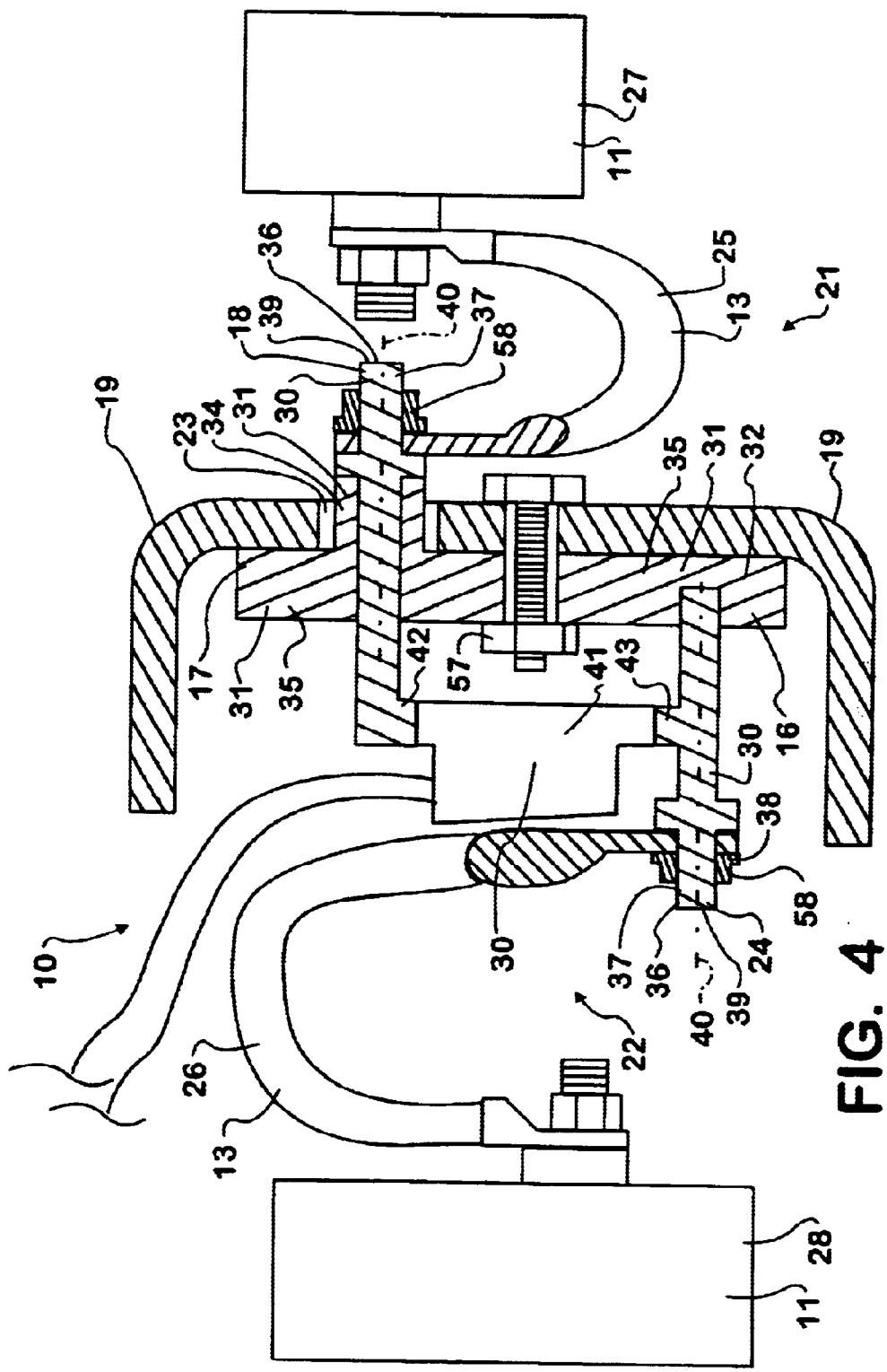
FIG. 4 shows, partially in section, a fourth embodiment of the electrical connection assembly of the present invention mounted to the module mounting component of the present invention and electrically connected to the first electrical component and the second electrical component of the invention.
Figure 11:
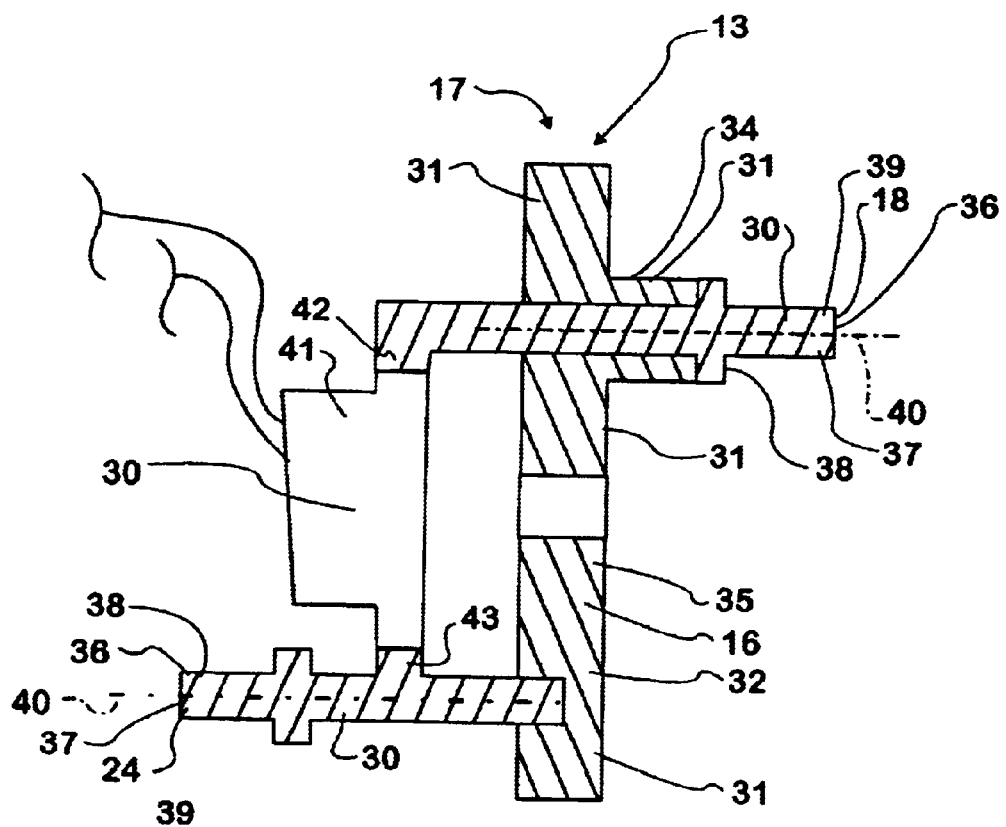
FIG. 11 shows, partially in section, a fourth embodiment of the electrical connection module of the present.

The electrical switching device 41 that the electrical connection module 17 may comprise may be a relay type switch. The construction of relay type switches is well known. Relay type switches are constructed such that the operational state (open or closed) of the electrical switching device 41 is at least partially dependent upon events that occur in one or more electrical control circuits, to which, switch control elements of the relay type switch are electrically connected. Some simple relay type switches assume one operational state (open or closed) when current flows in a switch control circuit to which the relay type switch is electrically connected and they assume the opposite operational state (open or closed) when there is no current flow in the switch control circuit. Numerous other designs of relay type switches, the operational state of which is influenced by events in one or more electrical control circuits connected to the relay type switches, are well known and may be employed in the electrical connection module 17 of the present invention. The utilization of a relay type switch as the electrical switching device 41 of the electrical connection module 17 may have a number of advantages as compared to the use of a mechanically actuated type switch. The use of a relay type switch facilitates the construction of an electrical system 10 that allows for remote control of the operational state of the electrical switching device 41 of the electrical connection module 17. The use of a relay type switch also facilitates the construction of an electrical system 10 in which control of the operational state of the electrical switching device 41 can be executed at least partially automatically by one or more control devices such as a microcomputer. FIGS. 4 and 11 illustrate electrical connection modules 17 that include electrical switching devices 41 that are relay type electrical switches electrically connected between the first electrical terminal 18 and the second electrical terminal 24 of the electrical connection module 17 in a manner in accordance with the present invention. The relay type electrical switch is illustrated in a relatively simplified manner without inclusion of many of the details of construction of the relay type switch in these figures. There are many different types of relay type switches, the details of the construction of which are well known, that could be utilized in the electrical connection module 17 of the present invention. The electrical switching device 41 of the electrical connection module 17 may be a mechanically latching relay type switch. The mechanically latching relay type switch of one embodiment may be caused to enter its closed operational state by a momentary flow of current in a first electrical control circuit connected to the electrical switching device 41. The construction of the mechanically latching relay type switch of this embodiment is such that, upon a momentary flow of current in the first electrical control circuit causing the switch to assume its closed operational state, the electrical switching device 41 latches in its closed operational state. The mechanically latching relay type switch of this embodiment may be caused to enter its open operational state by a momentary flow of current in a second electrical control circuit connected to the electrical switching device 41. The construction of the mechanically latching relay type switch of this embodiment is such that upon a momentary flow of current in the second electrical control circuit causing the switch to assume its open operational state, the electrical switching device 41 latches in its open operational state. The mechanically latching relay type switch is constructed such that, once it is latched in a respective operational state (open or closed), it will remain in that operational state until current flow in either the first electrical control circuit or the second electrical control circuit causes it to change operational state. FIGS. 4 and 11 illustrate electrical connection modules 17 that include electrical switching devices 41 that are mechanically latching relay type switches electrically connected between the first electrical terminal 18 and the second electrical terminal 24 of the electrical connection module 17 in a manner in accordance with the present invention. The mechanically latching relay type switch is illustrated in a relatively simplified manner without inclusion of many of the details of construction of the mechanically latching relay type switch in the figures. There are many different types of mechanically latching relay type switches, the details of the construction of which are well known, that could be utilized in the electrical connection module 17 of the present invention.

An important consideration in the design and construction of any electrical connection assembly 13 is the magnitude of the electrical currents that will flow through the components of the electrical connection assembly 13. If electrical currents of a very large magnitude flow through the components of an electrical connection assembly 13, undesirable heating of the components of the electrical connection assembly 13 can occur. Such undesirable heating of the components of the electrical connection assembly 13 can result in damage to these components. The magnitude of the electrical current that will flow through the electrical connection assembly 13 of the present invention is primarily dependent upon the construction of the rest of the electrical system 10 of which the electrical connection assembly 13 of the present invention is a part. As a result, the components of the electrical connection assembly 13 should be of a construction such that the largest magnitude electrical currents that are expected to flow through them would not cause damage to the components of the electrical connection assembly 13. The electrical connection assembly 13 and the components of the electrical connection assembly 13 of the present invention may be designed and constructed to transmit virtually any maximum magnitude of electrical current through them without incurring damage. In general, the greater the cross sectional area of electricity conducting elements of the components of the electrical connection assembly 13, the greater the magnitude of the electrical current that can be carried by the components without causing undesirable heating of the components. In the preferred embodiment, the electrical connection assembly 13 electrically connects electrical batteries 12 of a vehicle 20 to an electric engine starter motor 44 and other portions of an electrical system 10 of the vehicle 20. As a result, the electrical connection assembly 13 of the preferred embodiment must be constructed to permit the constant flow of relatively large electrical currents through it and the flow of even larger currents through it on a short term basis. For example, such an electrical connection assembly 13 may be required to carry an electrical current of 200 Amperes constantly and an electrical current of up to 1000 Amperes for short periods of time. The electricity carrying elements of the electrical connection module 17 of the preferred embodiment must, therefore, be constructed with an appropriate size to handle such large electrical currents. All other components of the electrical connection assembly 13 must also, obviously, be constructed to conduct such large magnitude electric currents without incurring damage. The design of electricity conducting elements to carry certain magnitudes of electrical current without being damaged is a fairly well developed and known science. One of ordinary skill in the art could, therefore, easily tailor the construction of such components as the first electric terminal 18, the second electrical terminal 24, the rigid metallic member 29 (if present), and the electrical switching device 41 (if present) to be appropriate for the magnitude of electrical current that will flow through them. Recently, relay type electrical switches and particularly mechanically latching relay type electrical switches constructed in a manner suited for conduction of electrical currents of the large magnitudes that flow through the electrical connection assembly 13 of the preferred embodiment have become fairly well known.

Dependent upon the construction of the module mounting component 19, it may be necessary to provide structure to electrically isolate some or all of the electricity conducting components 30 of the electrical connection module 17 from the module mounting component 19. The electricity conducting components 30 of the electrical connection module 17 being those components that are intended to carry electricity as part of the normal functioning of the electrical connection assembly 13. The electricity conducting components 30 of the electrical connection module 17 would include the first electrical terminal 18, the second electrical terminal 24 and any components intended to electrically connect the first electrical terminal 18 to the second electrical terminal 24. As mentioned above, the electrical connection module 17 may include any of a number of different types of components, including, but not limited to a rigid metallic member 29 and an electrical switching device 41, for electrically connecting the first electrical terminal 18 to the second electrical terminal 24. There may, additionally, be any number of other electricity conducting components 30 included in the electrical connection module 17, some or all of which may need to be electrically isolated from the module mounting component 19. The module mounting component 19 may be constructed of a material that has a relatively high electrical resistance and it may, therefore, be unnecessary to electrically isolate the electricity conducting components of the electrical connection module 17 from the module mounting component 19. Alternatively, the module mounting component 19 may be constructed of a material that has a relatively low electrical resistance such as a metallic material. In such a case, it may be necessary to include electrical insulation material 31 in the electrical connection module 17 in order to prevent electricity from flowing undesirably from the electrical connection module 17 to the module mounting component 19. The electrical insulation material 31 would be a material that has a relatively high electrical resistance. The electrical insulation material 31 would be engaged to the electrical connection module 17 in positions to ensure that the electricity conducting components 30 of the electrical connection module 17 are properly electrically isolated from the module mounting component 19. The electrical insulation material 31 would be positioned at points where electricity conducting components 30 of the electrical connection module 17 might otherwise come into contact with the module mounting component 19 and become electrically connected to it in an undesirable manner. The electrical insulation material 31 would be engaged to the electrical connection module 17 at points to provide such electrical isolation of the electricity conducting components 30 when the electrical connection module 17 is properly mounted to the module mounting component 19. For instance, in the preferred embodiment, the electrical connection module 17 comprises first terminal electrical insulation material 34. The first terminal electrical insulation material 34 is engaged to the electrical connection module 17 in a position such that it radially surrounds a portion of the first electrical terminal 18. The first terminal electrical insulation material 34 surrounds a portion of the first electrical terminal 18 that protrudes through the passageway 23 defined through the module mounting component 19 when the electrical connection module 17 is properly mounted to the module mounting component 19. The first terminal electrical insulation material 34 prevents that portion of the first electrical terminal 18 that it surrounds from undesirably coming into direct contact with and electrically connecting to adjacent portions of the module mounting component 19. When the electrical connection module 19 is properly mounted to the module mounting component 19 the first electrical terminal 18 extends from the second side 22, through the passageway 23 defined through the module mounting component 19, to the first side 21 of the module mounting component 19. Also, when the electrical connection module 17 is properly mounted to the module mounting component 19, the second electrical terminal 24 is disposed substantially entirely upon the second side 22 of the module mounting component 19. As mentioned above, the electrical connection module 17 may include a rigid metallic member 29 that is electrically connected to the first electrical terminal 18 and the second electrical terminal 24. As was also mentioned above, the electrical connection module 17 may, alternatively, have an electrical switching device 41 disposed between the first electrical terminal 18 and the second electrical terminal 24. The electrical connection module 17 may have body electrical insulation material 35 engaged to the electrical connection module 17. The body electrical insulation material 35 would be engaged to the electrical connection module 17 in a position such that it would be disposed between whichever of the rigid metallic member 29 and the electrical switching device 41 that the electrical connection module 17 comprises and the module mounting component 19. Thus, the body electrical insulation material 35 would electrically isolate whichever of the rigid metallic member 29 and the electrical switching device 41 that the electrical connection module 17 comprises from the module mounting component 19.

In the preferred embodiment, the electrical connection module 17 includes a structural insulation member 32. The structural insulation member 32 is constructed of electrical insulation material 31 that has a relatively high electrical resistance. In the preferred embodiment, the electrical connection module 17 is constructed such that substantially all components of the electrical connection module 17 except the first electrical terminal 18 are disposed upon a side of the structural insulation member 32 opposite a free end 36 of the first electrical terminal 18. Thus, when an electrical connection module 17 constructed in such a manner is properly mounted to the module mounting component 19, the structural insulation member 32 is disposed between substantially all components of the electrical connection module 17 and the module mounting component 19, except the first electrical terminal 18. The structural insulation member 32, thus, electrically isolates substantially all components of the electrical connection module 17 from the module mounting component 19. The structural insulation member 32 may, additionally, be constructed with such a strength, and may be engaged to the other components of the electrical connection module 17 in a manner such that it provides a substantial amount of reinforcement to the rigid body 16 of the electrical connection module 17. This reinforcement that the structural insulation member 32 provides for the rigid body 16 of the electrical connection module 17 may be in addition to or instead of reinforcement provided by the rigid metallic member 29 that may or may not be included in the electrical connection module 17. The structural insulation member 32 may, in fact, alone or in conjunction with the rigid metallic member 29, substantially constitute the rigid body 16 of the electrical connection module 17.

The construction of the first electrical terminal 18 and the second electrical terminal 24 may be of many different designs that allow for electrical connection of the first electrical component 27 and the second electrical component directly or indirectly to them. The portion of each respective electrical terminal 39 to which electrical components are electrically connected may be of a male design or a female design many variations of each of which are well known. In the preferred embodiment, each electrical terminal 39 comprises a threaded shaft portion 37. In this embodiment, each electrical terminal 39 also defines a shoulder 38. The shoulder 38 of each electrical terminal 39 is a surface that extends radially outwardly of the threaded shafted portion 37 of the electrical terminal 39 in directions perpendicular to a shaft axis 40 of a respective electrical terminal 39. The shoulder 38 of each electrical terminal 39 would be defined at a point on each electrical terminal 39 further from the free end 36 of each electrical terminal 39 than the threaded shaft portion 37 of the respective electrical terminal 39. The material that defines the shoulder 38 of each respective electrical terminal 39 is preferably a material that has a relatively low electrical resistance. A nut 58 threadingly engaged to the threaded shaft portion 37 of a respective electrical terminal 39 may be utilized to compress an electricity conducting element of an electrical component against the shoulder 38 of the respective electrical terminal 39. Thus, the electricity conducting element that is compressed against the shoulder 38 is electrically connected to the respective electrical terminal 39 and the electrical component that the electricity conducting element is electrically connected to is electrically connected to the electrical terminal 39.

Figure 5:
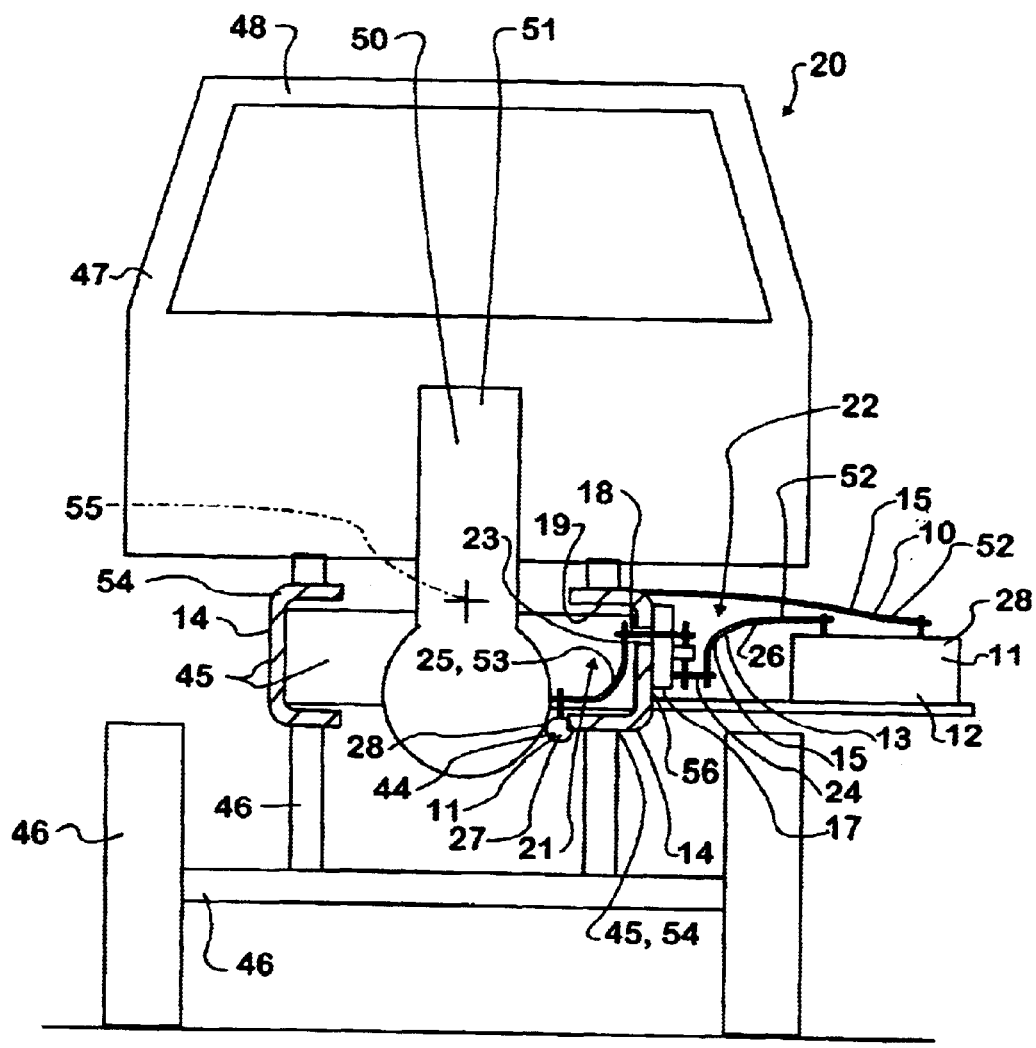
FIG. 5 is a frontal view, partially in section, of a vehicle according to the present with the electrical connection module of the present invention mounted between the frame rails of the vehicle.
Figure 6:
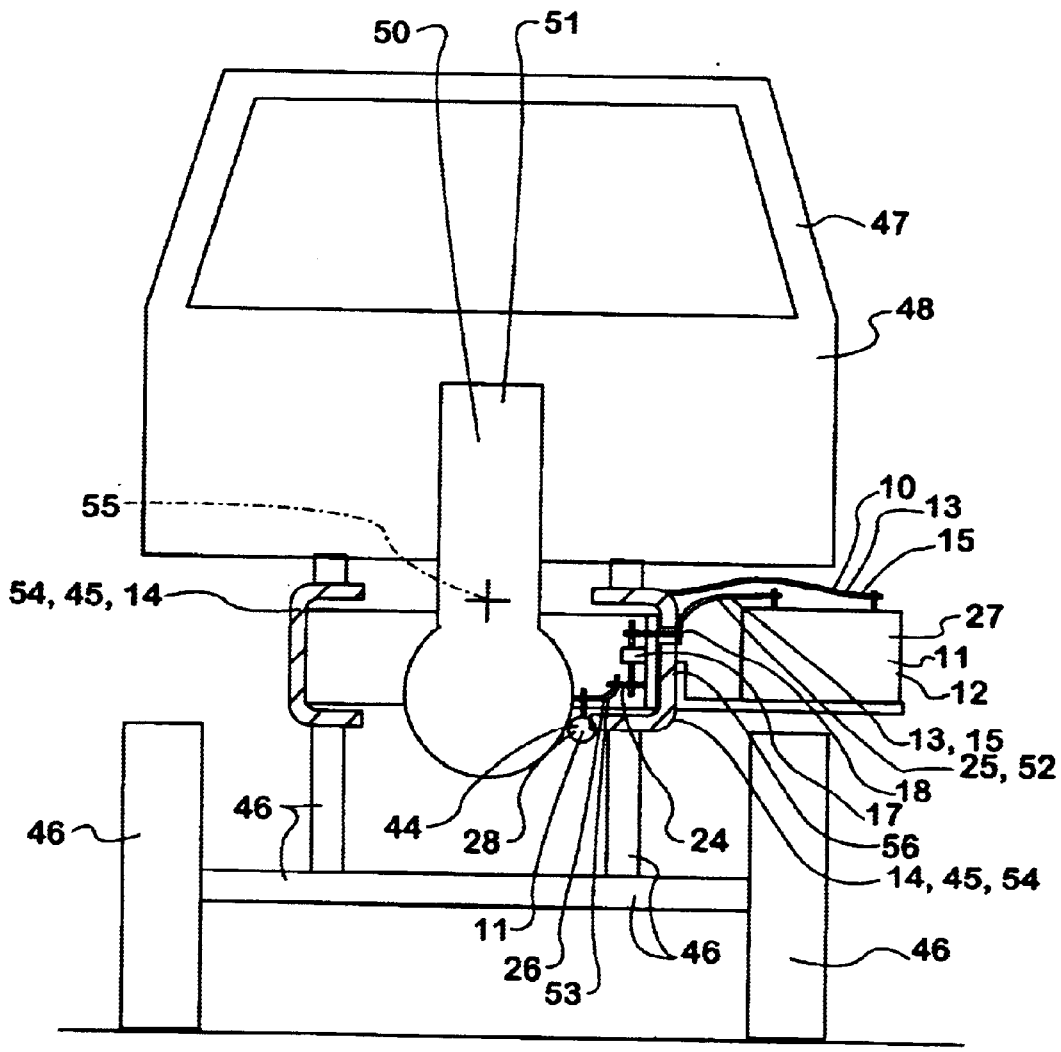
FIG. 6 is a frontal view, partially in section, of a vehicle according to the present with the electrical connection module of the present invention mounted outside the frame rails of the vehicle.
Figure 7:
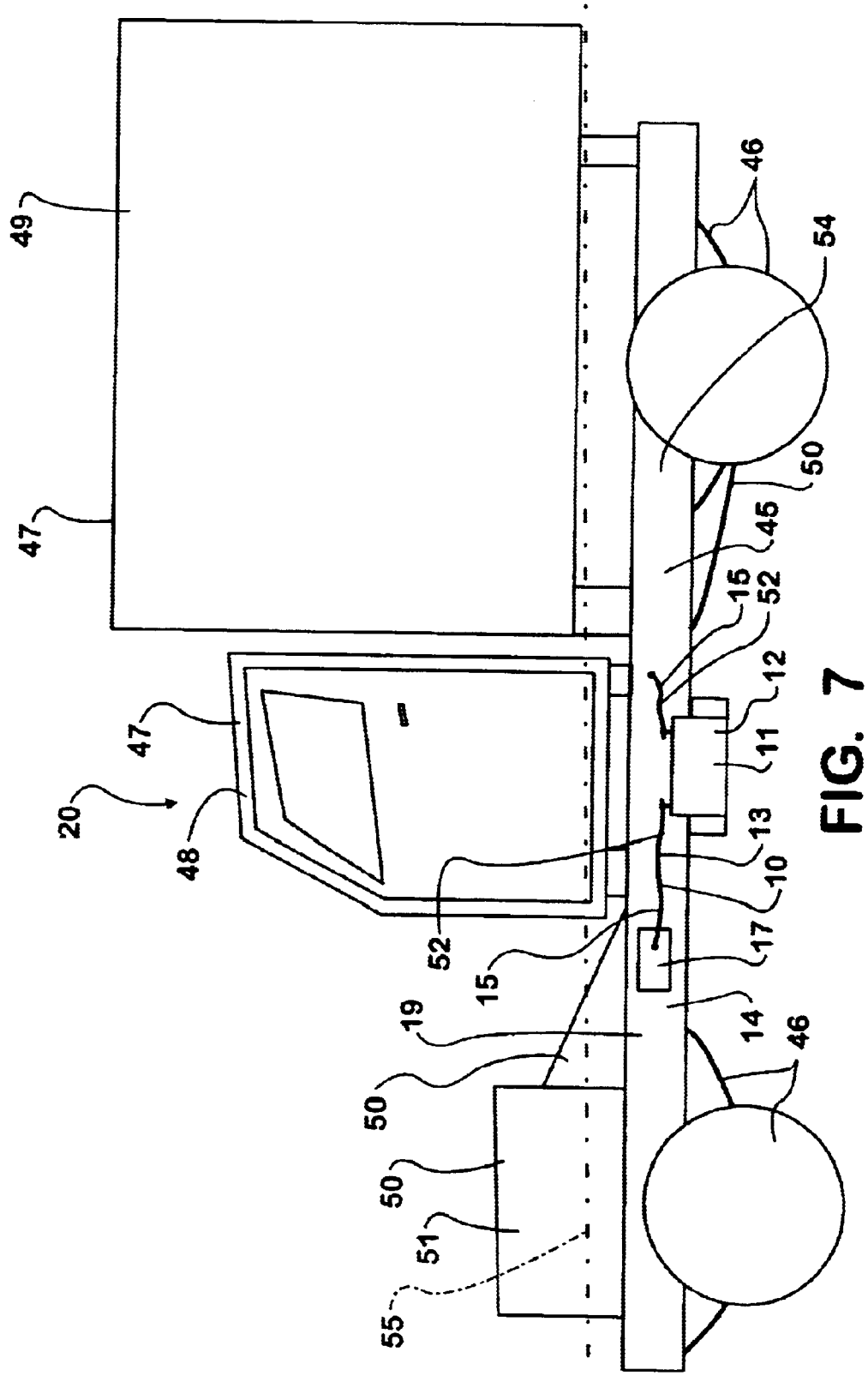
FIG. 7 is a side elevational view of a vehicle according to the present invention.

As was mentioned above, the electrical connection assembly 13 of the present invention may be a component of an electrical system 10 of a vehicle 20. Such a vehicle 20 would comprise a frame 45 to which a large percentage of the components of the vehicle 20 would be engaged directly or indirectly. A large percentage of the components of the vehicle 20 would also derive support directly or indirectly from the frame 45. The vehicle 20 would also comprise a suspension system 46 engaged to the frame 45. The suspension system 46 would be constructed and engaged to the frame 45 in such a manner to support the frame 45 above the ground and to provide the vehicle 20 with a relatively low resistance to motion along the ground. The vehicle 20 would also likely comprise one or more body structures 47 engaged directly or indirectly to and supported directly or indirectly by the frame 45 of the vehicle 20. The body structures 47 of the vehicle 20 would be constructed to support people and/or objects upon or within them. Some examples of body structures 47 that are well known include occupant cabins 48 and cargo bodies 49. A vehicle 20 that comprises the electrical connection assembly 13 of the present invention may further comprise a powertrain 50 the purpose of which is to motivate the vehicle 20 along the ground. Such a powertrain 50 would likely be engaged to the frame 45 and the suspension system 46 of the vehicle 20. The powertrain 50 may comprise an internal combustion engine 51 and an electric engine starter motor 44 for "starting" the internal combustion engine 51 as is well known. The vehicle 20 would also comprise an electrical system 10 that includes two or more electrical components 11. The electrical system 10 of the vehicle 20 also comprises one or more electrical connection assemblies 13, including the electrical connection assembly 13 of the present invention, that electrically connect to one another the electrical components 11 of the electrical system 10 of the vehicle 20. Vehicles with electrical connection assemblies 13 and electrical connection modules 17 according to the present invention are illustrated in FIGS. 5, 6, and 7.

The electrical connection assembly 13 of the present invention may be used to electrically connect any of a number of different types of electrical components 11. Different types of electrical components 11 that the first electrical component 27 could be, include, but are not limited to, motors, lights, switches, generators, controllers, and batteries. In one embodiment, the first electrical component 27, which is electrically connected to the first electrical terminal 18, comprises one or more electrical batteries 12. These electrical batteries 12 that the first electrical component 27 may comprise may be automotive type electrical batteries 12 for storing electrical energy for utilization to perform tasks such as powering an engine starter motor 44 for "starting" an internal combustion engine 51 of a vehicle 20. The first side electricity conducting components 25 that may be included in the electrical connection assembly 13 may comprise automotive type battery cables 52 electrically connected to automotive type electrical batteries 12 and also electrically connected to the first electrical terminal 18. The construction of battery cables 52 and components for electrically connecting battery cables 52 to automotive type electrical batteries 12 and other types of electrical components is well known. The second electrical component 28 that is electrically connected to the second electrical terminal 24 of the electrical connection module 17 may also be one of many different types of electrical components. Different types of electrical components 11 that the second electrical component 28 could be, include, but are not limited to, motors, lights, switches, generators, controllers, and batteries. In one embodiment, the second electrical component 28 is an engine starter motor 44 for driving the components of an internal combustion engine 51 that is not operational in order to commence operation of or "start" the internal combustion engine 51. The construction of such engine starter motors 44 and their engagement to internal combustion engines 51 is well known. The second side electricity conducting components 26 that may be included in the electrical connection assembly 13 may comprise large gauge electrical cables 53 electrically connected to the engine starter motor 44 and also electrically connected to the second electrical terminal 24 of the electrical connection module 17. The large gauge electrical cables 53 that may be electrically connected to the engine starter motor 44 and the second electrical terminal 24 would likely be of a construction similar to automotive type battery cables 12 as is well known. It should be understood that the present invention contemplates, as an alternative to some of the specifics described above an electrical system 10 in which the first electrical component 27 comprises an engine starter motor 44 and the second electrical component 28 comprises automotive type electrical batteries 12. In such an alternative embodiment of the electrical system 10 of the present invention the first side electricity conducting components 25, if present, would be large gauge electrical cables 53 and the second side electricity conducting components 26, if present, would be automotive type battery cables 52.

In the preferred embodiment, the module mounting component 19 is engaged to the vehicle 20 in some manner. A first electrical component 27 of the vehicle 20 is disposed generally upon the first side 21 of the module mounting component 19. As was mentioned above, the rigid body 16 of the electrical connection module 17 is fixedly mounted to the module mounting component 19 and is disposed generally upon the second side 22 of the module mounting component 19. The first electrical terminal 18 of the electrical connection module 17 is fixedly engaged to the rigid body 16 of the electrical connection module 17. The point of engagement of the first electrical terminal 18 to the rigid body 16 of the electrical connection module 17 is disposed upon the second side 22 of the module mounting component 19. The first electrical terminal 18 extends from its point of engagement to the rigid body 16, through a passageway 23 defined through the module mounting component 19, to its free end 36 that is disposed upon the first side 21 of the module mounting component 19. The first electrical component 27 is electrically connected to the first electrical terminal 18 at a point on the first side 21 of the module mounting component 19. The first electrical component 27 may be directly electrically connected to the first electrical terminal 18 of the electrical connection module 17. Alternatively, first side electricity conducting components 25 may be electrically connected to the first electrical component 27 and also to the first electrical terminal 18 at a point on the first side 21 of the module mounting component 19. Electricity may flow through the first side electricity conducting components 25 between the first electrical component 27 and the first electrical terminal 18. The second electrical terminal 24 is fixedly engaged to the rigid body 16 of the electrical connection module 17 and extends from a point of engagement to the rigid body 16 to its free end 36 which is disposed upon the second side 22 of the module mounting component 19. The electrical system 10 of the vehicle 20 comprises a second electrical component 28 that is disposed generally upon the second side 22 of the module mounting component 19. The second electrical component 28 may be directly electrically connected to the second electrical terminal 24. Alternatively, the electrical system 10 of the vehicle 20 may comprise second side electricity conducting components 26 that are electrically connected to the second electrical component 28 and also to the second electrical terminal 24 at a point on the second side 22 of the module mounting component 19. Electricity may, thus, flow through the second side electricity conducting components 26 between the second electrical component 28 and the second electrical terminal 24. As was mentioned above, the electrical connection module 17 is constructed such that the first electrical terminal 18 and the second electrical terminal 24 are or may be electrically connected to one another so that electricity may flow between them. Thus, when the first electrical terminal 18 and the second electrical terminal 24 are electrically connected to one another the first electrical component 27 and the second electrical component 28 are electrically connected to one another and electricity may flow between them through the electrical connection module 17.

In the embodiment where the electrical connection assembly 13 of the present invention is utilized to electrically connect electrical components 11 of an electrical system of a vehicle 20, the module mounting component 19 may be any of a number of different components of the vehicle 20. The module mounting component 19 may be a component of the frame 45, a component of the suspension system 46, a component of a body structure 47, or a component of virtually any system or structure of the vehicle 20. In one embodiment, the frame 45 of the vehicle 20 comprises two frame rails 54 that extend substantially parallel to one another and substantially parallel to a longitudinal axis 55 of the vehicle 20. Construction of frames 45 of vehicles 20 in such a manner is well known particularly for heavy duty truck vehicles 20. Such frame rails 54 may have many different cross-sectional shapes through cross-sections of the frame rails 54 perpendicular to the longitudinal axis 55 of the vehicle 20. Many such frame rails 54 are constructed with a web portion 56 that is a substantially vertically oriented wall portion of the frame rail 54 that extends in directions parallel to the longitudinal axis 55 of the vehicle 20. In one embodiment of the present invention, a frame rail 54 constitutes the module mounting component 19 and the rigid body 16 of the electrical connection module 17 is fixedly engaged to the web portion 56 of the frame rail 54 that is the module mounting component 19. The passageway 23 defined through the module mounting component 19, through which the first electrical terminal 18 protrudes from the second side 21 to the first side 22 of the module mounting component 19, may be defined through the web portion 56 of the frame rail 54. The second electrical component 28, which may be an engine starter motor 44 as described above, may be disposed generally upon the second side 22 of the frame rail 54 that constitutes the module mounting component 19 and generally between the two parallel frame rails 54 of the vehicle 20. A same vehicle 20 may include a first electrical component 27 that comprises automotive type electrical batteries 12 that are disposed upon a first side 22 of the frame rail 54 that constitutes the module mounting component 19. The first electrical component 27 which comprises one or more automotive type batteries 12 would, thus, be disposed upon a side of the frame rail 54 that constitutes the module mounting component 19 opposite the second electrical component 28 which may be an engine starter motor 44. The automotive type batteries 12 would, in a vehicle 20 constructed in such a manner, be connected to the engine starter motor 44 through the electrical connection module 17. The rigid body 16 of the electrical connection module 17 could be disposed generally between the frame rails 54 of the vehicle 20 as described above or and the second side 22 of the module mounting component 19 would be considered to be disposed generally between the frame rails 54. A vehicle 20 constructed in such a manner is illustrated in FIG. 6. Alternatively, the rigid body 16 of the electrical connection module 17 could be disposed upon a side of the frame rail 54, that is the module mounting component 19, opposite the space between the frame rails 54. In such a case the space between the frame rails 54 would be considered to be on the first side 21 of the module mounting component 19. A vehicle 20 constructed in such a manner is illustrated in FIG. 5.

Those skilled in the art will appreciate that modifications could be made to the invention as described without departing from the spirit and scope of the invention and thus the scope of the invention is limited only by the following claims.

What is claimed is:

1. A vehicle, comprising:
   (a) a frame, to which a large percentage of components of said vehicle are engaged directly or indirectly, and from which a large percentage of components of said vehicle derive support directly or indirectly;
   (b) a suspension system that is engaged to and provides support for said frame;
   (c) one or more body structures engaged to and supported by said frame directly or indirectly;
   (d) an electrical system engaged to said vehicle;
   (e) a module mounting component engaged to said vehicle;
   (f) wherein said electrical system comprises a first electrical component engaged to said vehicle and disposed generally upon a first side of said module mounting component;
   (g) wherein said electrical system comprises a second electrical component engaged to said vehicle and disposed generally upon a second side of said module mounting component;
   (h) wherein said electrical system comprises an electrical connection assembly that is electrically connected to and extends between said first electrical component and said second electrical component;
   (i) wherein said electrical connection assembly comprises an electrical connection module;
   (j) wherein said electrical connection module comprises a rigid body that is fixedly mounted to said module mounting component and is disposed primarily upon said second side of said module mounting component;
   (k) wherein said electrical connection module comprises a first electrical terminal that is of rigid construction and that extends from a point of fixed engagement of said first electrical terminal to said rigid body disposed upon said second side of said module mounting component, through a passageway defined through said module mounting component, to a free end of said first electrical terminal that is disposed upon said first side of said module mounting component;
   (l) wherein said first electrical component is electrically connected to said first electrical terminal at a point disposed upon said first side of said module mounting component;
   (m) wherein said electrical connection module comprises a second electrical terminal that is of a rigid construction and that is fixedly engaged to said rigid body of said electrical connection module;
   (n) wherein said second electrical terminal extends from a point of engagement to said rigid body of said electrical connection module to a free end of said second electrical terminal that is disposed upon said second side of said module mounting component;
   (o) wherein said second electrical component is electrically connected to said second electrical terminal at a point disposed upon said second side of said module mounting component;
   (p) wherein said electrical connection module is constructed such that said first electrical terminal and said second electrical terminal are or may be electrically connected to one another so that electricity may flow between said first electrical terminal and said second electrical terminal;
   (q) said rigid body comprises a rigid metallic member;
   (r) said first electrical terminal is rigidly engaged to said rigid metallic member in a manner such that said first electrical terminal is electrically connected to said rigid metallic member so that electrically may flow between said first electrical terminal and said rigid metallic member;
   (s) said second electrical terminal is engaged to said rigid metallic member in a manner such that said second electrical terminal is electrically connected to said rigid metallic member so that electricity may flow between said second electrical terminal and said rigid metallic member;
   (t) said first electrical terminal and said second electrical terminal are always electrically connected to one another by said rigid metallic member such that electricity may flow between them through said rigid metallic member that they are both electrically connected to;
   (u) said electrical connection module further comprises electrical insulation material that has a relatively high electrical resistance and that is engaged to said electrical connection module in locations such that said electrical insulation material is diseased between electrically conducting components of said electrical connection module and adjacent portions of said module mounting component that said electrically conducting components of said electrical connection module might otherwise contact and electrically connect to;

(v) said rigid metallic member is constructed with a strength and is engaged to other portions of said rigid body in a manner such that said rigid metallic member provides substantial reinforcement for said rigid body;

(w) said electrical connection module comprises first terminal electrical insulation material that radially surrounds a portion of said first electrical terminal that protrudes through said passageway defined through said module mounting component;

(x) said electrical connection module comprises body electrical insulation material that is engaged to said electrical connection module at a position such that said rigid metallic member is disposed upon a side of said body electrical insulation material opposite said free end of said first electrical terminal;

(y) said body electrical insulation material is disposed between said rigid metallic member and said module mounting component;

(z) said body electrical insulation material comprises a structural insulation member;

(aa) said structural insulation member is positioned such that substantially all components of said electrical connection module other than said first electrical terminal are disposed upon a side of said structural insulation member opposite said free end of said first electrical terminal;

(bb) said structural insulation member is constructed and engaged to other portions of said rigid body of said electrical connection module in a manner such that said structural insulation member, in conjunction with said rigid metallic member, provides substantial reinforcement for said rigid body of said electrical connection module;

(cc) one only of said first electrical component and said second electrical component of said vehicle comprises an engine starter motor;

(dd) whichever of said first electrical component and said second electrical component does not comprise an engine starter motor, comprises one or more automotive type electrical batteries;

(ee) said electrical connection assembly further comprises first side electrically conducting components that are electrically connected to said first electrical terminal of said electrical connection module and that are also electrically connected to said first electrical component;

(ff) said electrical connection assembly further comprises second side electricity conducting components that are electrically connected to said second electrical terminal of said electrical connection module and that are also electrically connected to said second electrical component;

(gg) whichever of said first side electricity conducting components and said second side electricity conducting components is electrically connected to said automotive type electrical batteries that either said first electrical component or said second electrical component comprises, comprises automotive type battery cables;

(hh) whichever of said first side electricity conducting components and said second side electricity conducting components is electrically connected to said engine starter motor that either said first electrical component or said second electrical component comprises, comprises large gauge electrical cables that are similar in construction to said automotive type battery cables;

(ii) said frame of said vehicle comprises two frame rails that are disposed such that they extend substantially parallel to one another and also substantially parallel to a longitudinal axis of said vehicle;

(jj) one of said frame rails of said frame of said vehicle is said module mounting component to which said electrical connection module is fixedly mounted;

(kk) said passageway defined through said module mounting component through which said first electrical terminal protrudes is defined through a web portion of said frame rail that is said module mounting component;

(ll) said engine starter motor, that either said first electrical component or said second electrical component comprises, is disposed generally between said two frame rails that said frame of said vehicle comprises; and (mm) said automotive type electrical batteries, that either said first electrical component or said second electrical component comprises, are located generally upon a side of said frame rail that is said module mounting component, opposite said engine starter motor.

2. The vehicle of claim 1, wherein:

(a) said first electrical terminal comprises a threaded shaft portion;

(b) said that electrical terminal defines a shoulder that extends beyond said threaded shaft portion of said first electrical terminal in directions perpendicular to and away from a shaft axis of said threaded shaft portion of said first electrical terminal;

(c) said shoulder defined by said first electrical terminal is defined at a point further from said free end of said first electrical terminal than said threaded shaft portion of said first electrical terminal;

(d) said second electrical terminal comprises a threaded shaft portion;

(e) said second electrical terminal defines a shoulder that extends beyond said threaded shaft portion of said second electrical terminal in directions perpendicular to and away from a shaft axis of said threaded shaft portion of said second electrical terminal; and (f) said shoulder defined by said second electrical terminal is defined at a point further from said free end of said second electrical terminal than said threaded shaft portion of said second electrical terminal.

3. A vehicle, comprising:

a) a frame, to which a large percentage of components of said vehicle are engaged directly or indirectly, and from which a large percentage of components of said vehicle derive support directly or indirectly;

(b) a suspension system that is engaged to and provides support for said frame;

(c) one or more body structures engaged to and supported by said frame directly or indirectly;

(d) an electrical system engaged to said vehicle;

(e) a module mounting component engaged to said vehicle;

(f) wherein said electrical system comprises a first electrical component engaged to said vehicle and disposed generally upon a first side of said module mounting component;

(g) wherein said electrical system comprises a second electrical component engaged to said vehicle and disposed generally upon a second side of said module mounting component;

(h) wherein said electrical system comprises an electrical connection assembly that is electrically connected to and extends between said first electrical component and said second electrical component;

(i) wherein said electrical connection assembly comprises an electrical connection module;

(j) wherein said electrical connection module comprises a rigid body that is fully mounted to said module mounting component and is disposed primarily upon said second side of said module mounting component;

(k) wherein said electrical connection module comprises a first electrical terminal that is of rigid construction and that extends from a point of fixed engagement of said first electrical terminal to said rigid body disposed upon said second side of said module mounting component, through a passageway defined through said module mounting component, to a free end of said first electrical terminal that is disposed upon said first side of said module mounting component;

(l) wherein said first electrical component is electrically connected to said first electrical terminal at a point disposed upon said first aide of said module mounting component;

(m) wherein said electrical connection module comprises a second electrical terminal that is of a rigid construction and that is fixedly engaged to said rigid body of said electrical connection module;

(n) wherein said second electrical terminal extends from a point of engagement to said rigid body of said electrical connection module to a free end of said second electrical terminal that is disposed upon said second side of said module mounting component;

(o) wherein said second electrical component is electrically connected to said second electrical terminal at a point disposed upon said second side of said module mounting component;

(p) wherein said electrical connection module is constructed such that said first electrical terminal and said second electrical terminal are or may be electrically connected to one another so that electrically may flow between said first electrical terminal and said second electrical terminal;

(q) one only of said fist electrical component and said second electrical component of said vehicle comprises an engine starter motor;

(r) whichever of said first electrical component and said second electrical component does not comprise an engine start motor, comprises one or more automotive type electrical batteries;

(s) said electrical connection assembly further comprises first side electricity conducting components that are electrically connected to said first electrical terminal of said electrical connection module and that are also electrically connected to said first electrical component;

(t) said electrical connection assembly further comprises second side electricity conducting components that are electrically connected to said second electrical terminal of said electrical connection module and that are also electrically connected to said second electrical component;

(u) whichever of said first side electricity conducting components and said second side electricity conducting components is electrically connected to said automotive type electrical batteries, that either said first electrical component or said second electrical component comprises, comprises automotive type battery cables;

(v) whichever of said first side electricity conducting components and said second side electricity conducting components is electrically connected to said engine starter motor, that either said first electrical component or said second electrical component comprises, comprises larger gauge electrical cables that are similar in construction to said automotive type battery cables;

(w) frame of said vehicle comprises two frame rails that are disposed such that they extend substantially parallel to one another and also substantially parallel to a longitudinal axis of said vehicle;

(x) one of said frame rails of said frame of said vehicle is said module mounting component to which said electrical connection module is fixedly mounted;

(y) said passageway defined through said module mounting component through which said first electrical terminal protrudes is defined through a web portion of said frame rail that is said module mounting component;

(z) said engine starter motor, that either said first electrical component or said second electrical component comprises, is disposed generally between said two frame rails that said frame of said vehicle comprises; and (aa) said automotive type electrical batteries, that either said first electrical component or said second electrical component comprises, are located generally upon a side of said frame rail that is said module mounting component, opposite said engine starter motor.

4. A vehicle, comprising:

(a) a frame, to which a large percentage of components of said vehicle are engaged directly or indirectly, and from which a large percentage of components of said vehicle derive support directly or indirectly;

(b) a suspension system that is engaged to and provides support for said frame;

(c) one or more body structures engaged to and supported by said frame directly or indirectly;

(d) an electrical system engaged to said vehicle;

(e) a module mounting component engaged to said vehicle;

(f) wherein said electrical system comprises a first electrical component engaged to said vehicle and disposed generally upon a first side of said module mounting component;

(g) wherein said electrical system comprises a second electrical component engaged to said vehicle and disposed generally upon a second side of said module mounting component;

(h) wherein said electrical system comprises an electrical connection assembly that is electrically connected to and extends between said first electrical component and said second electrical component;

(i) wherein said electrical connection assembly comprises an electrical connection module;

(j) wherein said electrical connection module comprises a rigid body that is fixedly mounted to said module mounting component and is disposed upon said second side of said module mounting component;

(k) wherein said electrical connection module comprises a first electrical terminal that is of rigid construction and that extends from a point of fixed engagement of said first electrical terminal to said rigid body disposed upon said second side of said module mounting component, through a passageway defined through said module mounting component, to a free end of said first electrical terminal that is disposed upon said first side of said module mounting component;

(j) wherein said first electrical component is electrically connected to said first electrical terminal at a point disposed upon said first side of said module mounting component;

(m) wherein said electrical connection module comprises a second electrical terminal that is of a rigid construction and that is fixedly engaged to said rigid body of said electrical connection module;

(n) wherein said second electrical terminal extends from a point of engagement to said rigid body of said electrical connection module to a free end of said second electrical terminal that is disposed upon said second side of said module mounting component;

(o) wherein said second electrical component is electrically connected to said second electrical terminal at a point disposed upon said second side of said module mounting component;

(p) wherein said electrical connection module is constructed such that said first electrical terminal and said second electrical terminal are or may be electrically connected to one another so that electricity may flow between said first electrical terminal and second electrical terminal;

(q) said electrical connection module further comprises an electrical switching device mounted to said rigid body of said electrical connection module;

(r) said electrical switching device is constructed and is electrically connected to said first electrical terminal and said second electrical terminal in a manner such that said first electrical terminal and said second electrical terminal may selectively be electrically connected to one another by causing said electrical switching device to assume a closed operational state;

(s) said electrical switching device is constructed and is electrically connected to said first electrical terminal and said second electrical terminal in a manner such that said first electrical terminal and said second electrical terminal may selectively be electrically disconnected from one another by causing said electrical switching device to assume an open operational state;

(t) said electrical device is a relay type switch;

(u) said electrical system of said vehicle comprises a first electrical control circuit to which said relay type switch is connected;

(v) said relay type switch and said first electrical control circuit are constructed such that whether said relay type switch is in a closed operational state or an open operational state depends at least partially upon event, such as current flow in said first electrical control circuit;

(w) said electrical connection module further comprises electrical insulation material that has a relatively high electrical resistance and that is engaged to said electrical connection module in locations such that said electrical insulation material is disposed between electricity conducting components of said electrical connection module and adjacent portions of said module mounting component that said electricity conducting components of said electrical connection module might otherwise contact and electrically connect to;

(x) said electrical connection module comprises first terminal electrical insulation material that radially surrounds a portion of said first electrical terminal that protrudes through said passageway defined through said module mounting component;

(y) said electrical connection module comprises body electrical insulation material that is engaged to said electrical connection module at a position such that said electrical switching device is disposed upon a side of said body electrical insulation material opposite said free end of said first electrical terminal;

(z) said body electrical insulation material is disposed between said electrical switching device and said module mounting component;

(aa) said body electrical insulation material comprises a structural insulation member;

(bb) said structural insulation member is positioned such that substantially all components of said electrical connection marine other than said first electrical terminal are disposed upon a side of said structural insulation member opposite said free end of said first electrical terminal;

(cc) said structural insulation member is constructed and engaged to other portions of said rigid body of said electrical connection module in a manner such that said structural insulation member provides substantial reinforcement for said rigid body of said electrical connection module;

(dd) said electrical system of said vehicle further comprises a second electrical control circuit;

(ee) said relay type switch is a mechanically latching relay type switch that is connected to both said first electrical control circuit and said second electrical control circuit of said electrical system of said vehicle;

(ff) said mechanically latching relay type switch and said first electrical control circuit are of such a construction that momentary flow of current in said first electrical control circuit causes said mechanically latching relay type switch to assume and mechanically latch in a closed operational state between said first electrical terminal and said second electrical terminal that are electrically connected to said mechanically latching relay type switch;

(gg) said mechanically latching relay type switch and said second electrical control circuit we of such a construction that momentary flow of current in said second electrical control circuit causes said mechanically latching relay type switch to assume and mechanically latch in an open operational state between said first electrical terminal and said second electrical terminal that are electrically connected to said mechanically latching relay type switch;

(hh) one only of said first electrical component and said second electrical component of said vehicle comprises an engine starter motor;

(ii) whichever of said first electrical component and said second electrical component does not comprise an engine starter motor, comprises one or more automotive type electrical batteries;

(jj) said electrical connection assembly further comprises first side electricity conducting components that are electrically connected to said first electrically terminal of said electrical connection module and that are also electrically connected to said first electrical component;

(kk) said electrical connection assembly further comprises second side electricity conducting components that are electrically connected to said second electrical terminal of said electrical connection module and that are also electrically connected to said second electrical component;

(ll) whichever of said first side electrically conducting components and said second side electricity conducting components is electrically connected to said automotive type electrical batteries, that either said first electrical component or said second electrical component comprises, comprises automotive type battery cables;

(mm) whichever of said first side electrically conducting components and said second side electricity conducting components is electrically connected to said engine starter motor, that either said first electrical component or said second electrical component comprises, comprises large gauge electrical cables that are similar in construction to said automotive type battery cables;

(nn) said frame of said vehicle comprises two frame rails that are disposed such that they extend substantially parallel to one another and also substantially parallel to a longitudinal axis of said vehicle;

(oo) one of said frame rails of said frame of said vehicle is said module mounting component to which said electrical connection module is fixedly mounted;

(pp) said passageway defined through said module mounting component through which said first electrical terminal protrudes is defined through a web portion of said frame rail that is said module mounting component;

(qq) said engine starter motor, that either said first electrical component or said second electrical component comprises, is disposed generally between said two frame rails that said frame of said vehicle comprises; and (rr) said automotive type electrical batteries, that either said first electrical component or said second electrical component comprises, are located generally upon a side of said frame rail that is said module mounting component, opposite said engine starter motor.

5. The vehicle of claim 4, wherein:

(a) said first electrical terminal comprises a threaded shaft portion;

(b) said first electrical terminal in directions perpendicular to and away from a shaft axis of said threaded shaft portion of said first electrical terminal;

(c) said shoulder defined by said first electrical terminal is defined at a point further from said free end of said first electrical terminal than said threaded shaft portion of said first electrical terminal;

(d) said second electrical terminal comprises a threaded shaft portion at a free end of said second electrical terminal;

(e) said second terminal defines a shoulder that extends beyond said threaded shaft portion of said second terminal in directions perpendicular to and away from a shaft axis of said threaded shaft portion of said second electrical terminal; and (f) said shoulder defined by said second electrical terminal is defined at a point further from said free end of said second electrical terminal than said threaded shaft portion of said second electrical terminal.

6. A vehicle, comprising:

(a) a frame, to which a large percentage of compounds of said vehicle are engaged directly or indirectly, and from which a large percentage of compounds of said vehicle derive support directly or indirectly;

(b) a suspension system that is engaged to and provides support for said frame;

(c) one or more body structures engaged to and supported by said frame directly or indirectly;

(d) an electrical system engaged to said vehicle;

(e) a module mounting component engaged to said vehicle;

(f) wherein said electrical system comprises a first electrical component engaged to said vehicle and disposed generally upon a first side of said module mounting component;

(g) wherein said electrical system comprises a second electrical component engaged to said vehicle and disposed generally upon a second side of said module mounting component;

(h) wherein said electrical system comprises an electrical connection assembly that is electrically connected to and extends between said first electrical component and said second electrical component;

(i) wherein said electrical connection assembly comprises an electrical connection module;

(j) wherein said electrical connection module comprises an rigid body that is fixedly mounted to said module mounting component and is disposed primarily upon said second side of said module mounting component;

(k) wherein said electrical connection module comprises a first electrical terminal that is of rigid construction and that extends from a point of fixed engagement of said first electrical terminal to said rigid body disposed upon said second side of said module mounting component through a passageway defined through said module mounting component to a free end of said first electrical terminal that is disposed upon said first side of said module mounting component;

(l) wherein said first electrical component is electrically connected to said first electrical terminal at a point disposed upon said first side module mounting component;

(m) wherein said electrical connection module comprises a second electrical terminal that is of a rigid construction and that is fixedly engaged to said rigid body of said electrical connection module;

(n) wherein said second electrical terminal extends from a point of engagement to said rigid body of said electrical connection module to a free end of said second electrical terminal that is disposed upon said second side of said module mounting component;

(o) wherein said second electrical component is electrically connected to said second electrical terminal at a point dispose upon said second side of said module mounting component; and (p) wherein said electrical connection module is constructed such that said first electrical terminal and said second electrical terminal are or may be electrically connected to one another so that electricity may flow between said first electrical terminal and said second electrical terminal;

(q) said electrical connection module further comprises an electrical switching device mounted to said rigid body of said electrical connection module;

(r) said electrical switching device is constructed and is electrically connected to said first electrical terminal and said second electrical terminal in a manner such that said first electrical terminal and said second electrical terminal may selectively be electrically connected to one another by causing said electrical switching device to assume a closed operation state;

(s) said electrical switching device is constructed and is electrically connected to said first electrical terminal and said second terminal in a manner such that said first electrical terminal and said second electrical terminal may selectively be electrically disconnected from one another by causing said electrical switching device to assume an open operational state;

(t) said electrical switching device is a relay type switch;

(u) said electrical system of said vehicle comprises a first electrical control circuit to which said relay type switch is connected;

(v) said relay type switch and said first electrical control circuit are constructed such that, whether said relay type switch is in a closed operational state or an open operational state depends at least partially upon events, such as current flow, in said first electrical control circuit;

(w) one only of said first electrical component and said second electrical component of said vehicle comprises an engine start motor;

(x) whichever of said first electrical component and said second electrical component does not comprise an engine starter motor, comprises one or more automotive type electrical batteries;

(y) said electrical connection assembly further comprises first side electricity conducting components that are electricity connected to said first electrical terminal of said electrical connection module and that are also electrically connected to said first electrical component;

(z) said electrical connection assembly further comprises second side electricity conducting components that are electrically connected to said second electrical terminal of said electrical connection module and that are also electrically connected to said second electrical component;

(aa) whichever of said first side electricity conducting components and said second side electricity conducting components is electrically connected to said automotive type electrical batteries, that either said first electrical component or said second electrical component comprises, comprises automotive type battery cables;

(bb) whichever of said first side electricity conducting components and said second side electricity conducting components is electrically connected to said engine starter motor, that either said first electrical component or said second electrical component comprises, comprises larger gauge electrical cables that are similar in construction to said automotive type battery cables;

(cc) said frame of said vehicle comprises two frame rails that are disposed such that they extend substantially parallel to one another and also substantially parallel to a longitudinal axis of said vehicle;

(dd) one of said frame rails of said frame of said vehicle is said module mounting component to which said electrical connection module is fixedly mounted;

(ee) said passageway defined through said module mounting component through which said first electrical terminal protrudes is defined through a web portion of said frame rail that is said module mounting component;

(ff) said engine starter motor, that either said first electrical component or said second electrical component comprises, is disposed generally between said two frame rails that said frame of said vehicle comprises; and (gg) said automotive type electrical batteries, that either said first electrical component or said second electrical component comprises, are located generally upon a side of said frame rail that is said module mounting component, opposite side engine starter motor.

* * * * *